United States Patent [19]

Michelotti

[11] Patent Number: 4,583,787
[45] Date of Patent: Apr. 22, 1986

[54] SLANTING BUSHES FOR RIMS OF BICYCLE WHEELS

[75] Inventor: Guido Michelotti, Vicenza, Italy

[73] Assignee: Campagnolo S.P.A., Vicenza, Italy

[21] Appl. No.: 623,332

[22] Filed: Jun. 22, 1984

[30] Foreign Application Priority Data

Jun. 24, 1983 [IT] Italy ............................. 21778 A/83

[51] Int. Cl.[4] .......................... B60B 1/04; B60B 21/06
[52] U.S. Cl. ........................................ 301/58; 301/70
[58] Field of Search ................ 301/58, 61, 70, 73, 301/79

[56] References Cited

U.S. PATENT DOCUMENTS

| 518,627 | 4/1894 | Rastetter | 301/58 |
| 536,089 | 3/1895 | Levedahl et al. | 301/58 |
| 2,937,905 | 5/1960 | Allenburger | 301/58 |

FOREIGN PATENT DOCUMENTS

| 47148 | 1/1937 | France | 301/58 |
| 1516857 | 3/1968 | France | 301/58 |
| 720304 | 12/1954 | United Kingdom | 301/58 |

Primary Examiner—David A. Scherbel
Attorney, Agent, or Firm—Young & Thompson

[57] ABSTRACT

To improve the geometrical arrangement of spoked wheels for bicycles or motorcycles and lengthen the life thereof, the spoke nipples are applied on the wheel rims by means of bushes formed of two cylindrical coaxial bodies of different diameter for housing respectively the conical head and the cylindrical section of the nipples and being partially telescoped and reciprocally connected. The bushes are apt to be riveted onto the inner element of the rim, with the common axis of the cylindrical bodies slanting in respect of the rim radius by an angle equal to half of the mean angle between that of maximum deviation and that of minimum deviation of the wheel spokes, depending on their variable assembly conditions. The bushes are realized in two models, each of which has the common axis of the two cylindrical bodies slanting in respect of the rim radius symmetrically as in the other model, and they are applied into holes of the rim made along common axes having the four inclinations required to obtain the substantial coaxiality between the nipple and the wheel spoke in any assembly condition.

6 Claims, 2 Drawing Figures

SLANTING BUSHES FOR RIMS OF BICYCLE WHEELS

BACKGROUND OF THE INVENTION

As known, the rims of bicycle or motorcycle wheels are normally formed of a specially shaped ring, made of steel or light alloy, having an outer and an inner element connected by two flanks, the tire—which can be tubular, with inner tube plus outer cover, or with sealed cover (tubeless)—being inserted on said outer element.

It is also known that, to keep the system light and allow it to support the load being applied to the central hub of the wheels, the transmission of the efforts is born by spokes connecting the rim to the hub.

The spokes are suitably positioned according to two typical angles, the camber angle and the crossing angle. The first angle is that formed by each spoke in respect of the plane perpendicular to the wheel hub crossing the center line of the rim. This angle makes the system laterally stable to the right and to the left. The spokes depart from the center line of the rim and reach the hub, on the right and left flange thereof, at a suitable distance. They are positioned alternatively on the right and on the left.

The crossing angle is instead that which gives stability to the wheel in the torsional sense. If this angle were not provided for the spokes, the system would be unstable and any torsional stress, due to braking or acceleration, would cause a reciprocal rotation of the hub in respect of the rim, as the spoke—if positioned radially—would be unable to react to bending stresses, but would only react to tractive efforts or compressive stresses. For these reasons, and to keep the system stable, half of the right spokes and half of the left spokes are positioned in opposing directions.

Different executions are realized, according to the various types of performances having to be obtained, as far as lightness, air resistance, elasticity of radial comfort and so on.

Thus, the traditional wheels of sports bicycles can comprise 24-28-32-36 or 40 spokes.

Within the range of the variable "amount of spokes", there are furthermore hubs having differently spaced flanges, for a greater or smaller camber, and hubs whereon the holes for connection of the spokes are obtained along rims of different diameter, for a greater or smaller crossing angle.

In addition to this, to give a gradually higher torsional rigidity, the assembly can be done with a two, three or four crossing; this means that a spoke with dextrorotatory inclination meets two, three or four times—in its path from the hub to the rim—spokes having a left-handed inclination.

Within the range of all the variables heretofore described, it can be understood that the two camber and crossing angles differ from case to case.

In almost every case, the rims are constructed to face the problem of inclination of the spoke emerging from the rim only in the sense of the camber, while for the crossing angle the spoke's bearing on the rim is of the radial type.

A spoke for bicycle wheels is normally made with the end housed into the hub hole bent at 90° to its axis, and riveted to prevent its outlet from said hole. The other end is threaded to be screwed into a bush or nipple, which is threaded inside and has a frustoconical head for bearing on the rim. The spokes thus easily take up the angular positioning imparted on them, while their correct tension is established by appropriate screwing of the nipple on its outer part.

It is clear that the nipple bears on the rim with a frustoconical surface and that, since the hole for housing the nipple is obtained by piercing the wall of the inner element of the rim, said frustoconical surface bears onto a round-shaped edge having a radial axis; the crossing angle is hence not accomplished.

The described geometrical arrangement repeats itself also when a strengthening eyelet is inserted into the hole housing the nipple, and even when a stiffening bush is added between the outer element housing the tubular tire and the inner element for connection of the nipple.

With this arrangement, when the nipple is positioned slanting in respect of the circle formed by the edge of the hole, there is a zone of contact between the nipple and the wheel rim which is limited, in theory, to three geometrical points, and when a pressure is imparted to put the spoke under tension, the surface of these three points widens through strain proportionally to the specific pressure and to the strain strength of the two materials forming the nipple and the eyelet.

Within the range of the shapes involved and of the differences between the diameter of the inner cylinder of the eyelet and the outer diameter of the cylindrical section of the nipple, said nipple is normally positioned inclined by a far narrower angle than that taken up by the spoke for its geometrical settlement.

One thus has a nipple which is apt to move axially towards the wheel center, when a variable pressure is imparted on its limited zone of contact, and a spoke emerging from the nipple which forms an angle between the axis of its threaded zone in engagement with the nipple and the direction which it takes up to reach the hole in the hub.

Either of these two defects cause a loosening of the spokes while running, and reduce the life thereof due to the constant bending in correspondence of the angle where they emerge from the nipple.

It should be noted that the pre-tension state of the spokes is at the basis of the geometric stability of the rim of bicycle wheels. Normally, a spoke is extended by a few millimeter tenths in the range of elastic strains, in order to provide stability to the general structure of the hub-spokes-rim system, and a one millimeter hundredth yielding of one of the pre-tension bearings slackens by about 5% the tension of the spoke.

Besides, the initial curve in the spoke conformation has in its zone emerging from the nipple—owing to the heretofore described lack of concentricity—a curvature depending on the flexural rigidity of said spoke; such a curvature is reduced by pulling actions on the running spoke (and each reduction of said curvature increases the distance available between the two hub-rim bearings, thereby reducing its tension).

In running conditions, the wheel bearing on the ground receives the load of the cyclists's weight and of the bicycle from the hub, reducing the tension of the four or five spokes positioned in the neighbourhood of the point contacting the road and causing them to work under compression.

For a bicycle running at 40 Km/h, the traction on said spokes is reduced, and returns to the initial extent of about 40%, when they leave the zone of contact with the road, with a frequency of 5-6 times per second.

The "hammering" deriving therefrom determines, on one hand, the widening of the zone of contact of the nipple on the eyelet and, on the other hand, a reduction in the initial curvature of the spoke emerging from the nipple. Both things cause an approach between the pre-tension bearings of the spoke, reducing its axial tension.

As the phenomenon is casual, in the neighbourhood of the equilibrium reached in the assembly stage, there are spokes which lose tension to a considerable extent and others which lose less tension.

This loosening difference at once causes a rim deformation, especially in respect of the plane in which it lies. (With a radially stiff rim, the 0.01 mm yielding in the bearings causes a side shifting of the rim by 2.4 mm).

Now, when a rim twists in its plane, the bicycle skids sideways, compelling the cyclist to be more careful and to reduce the speed.

On the other hand, the described alternative action, whereby the spoke curvature in its zone emerging from the nipple is first reduced and then again increased, subjecting said spoke to alternating bending stress, abbreviates the life of the spoke which would instead be practically endless if the same were to be subjected to pure alternating tensile stress. Considering these drawbacks deriving from the structural arrangement adopted at present for bicycle wheels, the ideal solution to the problem would be to cause the nipple to bear onto the whole circular surface of the eyelet already in the first assembly, so as to cover a wide bearing surface with low specific pressure and no longer deformable upon cyclic change of the contact pressure, and to supply the circle of the contact edge with an axis mating with the axis which the spoke has to take up in order to eliminate the angle being formed where emerging from the nipple.

An accurate study of all the assembly conditions has been able to establish that, starting from the hole for the tire valve, all the spokes always maintain a constant condition of the camber angle and of the crossing angle. Which means, for example, however operate the variables concerning the number of spokes and the number of crossing, the spoke n after the valve hole, always has—for instance—a right-handed camber and a left-handed crossing angle, or viceversa.

There are, namely, four fundamental arrangements:
On the right of the valve hole:
right-handed camber, left-handed crossing angle;
left-handed camber, right-handed crossing angle;
On the left of the valve hole:
left-handed camber, right-handed crossing angle;
right-handed camber, left-handed crossing angle.

Furthermore, on varying of the crossing conditions, of the number of spokes, of the distance between flanges and hubs, and of the rim diameter along which are provided the holes for connection to the hub, for each spoke the variable of the two camber and crossing axes angles is reduced to a very small entity—such as to be easily absorbed by the deformations of the system during assembly—when using the precaution to position the nipple bearing seat with its axis on the bisecting line of the mean angle, between that of maximum deviation and that of minimum deviation of the spokes, depending on their variable assembly conditions, taking into account each possible combination.

The order of magnitude of the possible error is then reduced to 1/20 of the error actually existing on the usual production, practically undoing all the negative effects thereof.

SUMMARY OF THE INVENTION

To adopt this expedient on a rim for bicycle wheels—normally obtained from rolled tube or from sheet, and having an outer and an inner element connected by two flanks—the present invention provides a bush formed of two cylindrical coaxial bodies of different diameter, for housing respectively the conical head and the cylindrical section of a nipple for spokes, which two bodies are partially telescoped and reciprocally connected, said bush being apt to be riveted onto the inner element of the rim, with the common axis of said cylindrical bodies slanting in respect of the rim radius by an angle equal to half of the mean angle, between that of maximum deviation and that of minimum deviation of the wheel spokes, depending on their variable assembly conditions.

More exactly, for correct mounting of the wheel, said bush is realized in two models, each of which having the common axis of the two cylindrical bodies slanting in respect of the rim radius symmetrically as in the other model.

The two bushes are then mounted on the rim, respectively on the right and left side thereof, so as to realize four different conditions of inclination of the wheel spokes, which very satisfactorily solve the problem being faced as, by doing this, the common axis of the two cylindrical bodies takes up, after mounting on the rim, substantially the same inclination which, according to the already described rules, is taken up by the corresponding wheel spoke, so as to put this latter in the most appropriate stress conditions.

Between the two cylindrical bodies of the bush according to the invention there is a jointing element, formed of a complex geometrical figure which, in the bearing zone of the nipple conical head—namely close to the end part of smaller diameter of the cylindrical body, arranged inside the larger cylindrical body—has a plane perpendicular to the common axis of the two cylindrical bodies, while close to the end part of larger diameter of the cylindrical body which contains the smaller cylindrical body, it takes up a toroidal shape which is designed to mate with the outer surface of the inner element of the wheel rim, onto which the bush has to be applied.

The bushes according to the invention are mounted on the rim of a bicycle wheel by making in the outer element of the rim, where the tubular tire bears, holes of a diameter suited to receive the larger cylindrical body of the bushes, and by making in the inner element of the rim, from which depart the spokes, holes of a diameter suited to receive the smaller cylindrical body of the bushes, said holes being made along common axes, having the four inclinations required to obtain the substantial coaxiality between the nipple and the wheel spoke in any assembly condition.

Once the bushes have been mounted, the portion of the smaller cylindrical body of said bushes projecting inwardly of the wheel is riveted in order to carry the surface of the jointing element, connecting said smaller cylindrical body and the larger cylindrical body of the bushes, in strict contact with the outer surface of the inner element of the rim, so as to have no yieldings in use.

BRIEF DESCRIPTION OF THE DRAWINGS

The invention will now be described in further detail, with reference to the accompanying drawing, which represents by mere way of example a practical embodiment thereof, and in which.

DESCRIPTION OF THE PREFERRED EMBODIMENTS

Figure 1:
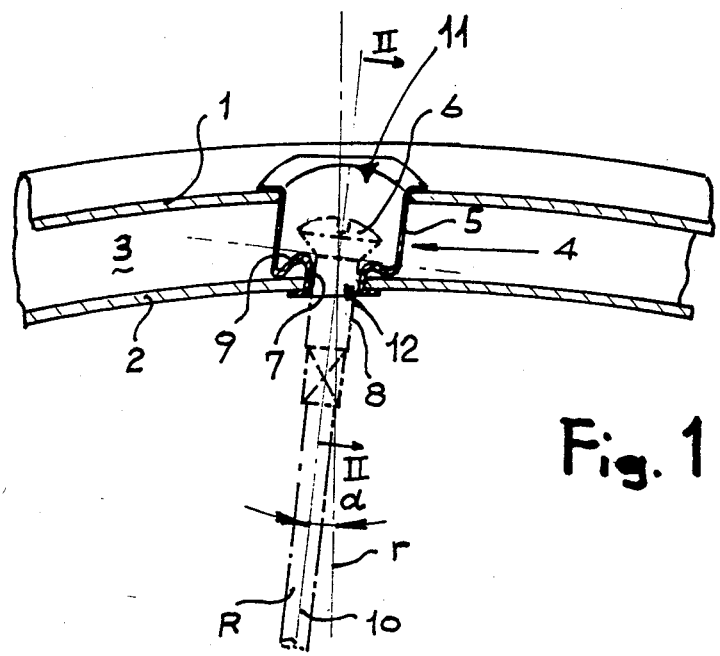
FIG. 1 is a section view along a median plane perpendicular to the axis through a rim for bicycle wheels, onto which is applied a bush according to the invention.

The illustrated embodiment of the invention is suitable for application on rims for bicycle wheels, of the type obtained from rolled tube or from sheet and having an outer element 1, an inner element 2 and two connecting flanks 3.

The bush 4 according to the invention, which is shown applied to a rim of the aforementioned type, comprises a cylindrical body 5 of larger diameter—apt to house the head 6 of a nipple for mounting the wheel spoke R—and a cylindrical body 7 of smaller diameter—apt to house the cylindrical section 8 of said nipple. The two cylindrical bodies 5 and 7 are coaxial, partially telescoped and connected by a jointing element 9.

Figure 2:
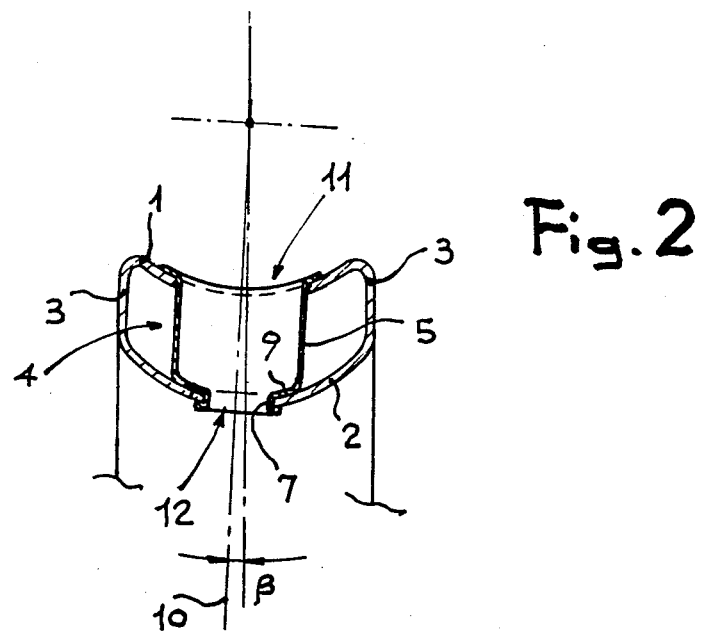
FIG. 2 is a cross-section through the same rim, along the line II—II of FIG. 1.

The axis 10, common to the two cylindrical bodies 5 and 7 of the bush, is inclined in respect of the radius r of the wheel rim by an angle equal to half of the mean angle between that of maximum deviation and that of minimum deviation of the wheel spokes, depending on their variable assembly conditions. FIG. 1 shows the component (crossing angle) in the wheel plane, while FIG. 2 shows the component (camber angle) in the plane of the wheel axis. It is evident that the axis 10, common to the two cylindrical bodies 5 and 7, emerges into space from the plane of the two figures of the accompanying drawing, which merely show the projections thereof.

It can also be seen that the axis 10 is drawn coinciding with the axis of the wheel spoke R. As can be easily understood from what has been previously explained, this is an approximation: in truth, the axis 10 and the spoke R are substantially, but not exactly coinciding; nevertheless, they may be considered such for practical purposes.

The jointing element 9 is shaped as a complex geometrical figure which, in the bearing zone for the nipple conical head 6—namely close to the end part of the smaller cylindrical body 7, positioned inside the larger cylindrical body 5—appears with a flat configuration 9A perpendicular to the bush axis 10, while close to the end part of the larger cylindrical body 5—which houses the smaller cylindrical body 7—it takes up a toroidal configuration 9B, apt to mate with the outer surface of the inner element 2 of the wheel rim.

As already mentioned, the bushes 4 according to the invention are mounted on the rim of a bicycle wheel after previously making, in the outer element 1 of the rim, holes 11 having a diameter adapted to house the larger cylindrical body 5 of the bushes, and in the inner element 2 of said rim, holes 12 (in axis with the holes 11) having a diameter adapted to house the smaller cylindrical body 7 of said bushes. Such holes will have to be made according to the four inclinations required to obtain—after wheel assembly has been completed—the substantial coaxiality between the nipples and the spokes for each assembly condition.

The bushes 4 are then inserted in the holes 11, 12 of the rim, taking care to appropriately use the two symmetrical bush models according to the invention, and to suitably position each of the two types of bushes in the single holes made in the rim, according to the inclinations given to the single holes.

Once the bushes 4 have been inserted into the holes 11, 12, the free end of the smaller cylindrical body 7 of said bushes will slightly project from the inner surface of the inner element 2 of the rim. This projecting part will then be riveted against the rim element 2, so as to carry the bushes into strict contact with the outer surface of said rim inner element 2 and thus prevent yieldings in use.

It should be noted that a few adjustments—which will at once be evident to the skilled in the art—will allow to adapt the heretofore described and illustrated bushes to rims for bicycle wheels of different type or design from that shown in the drawings.

Important goals can be achieved with the heretofore described solution according to the invention:

The time employed in mounting the wheels is thereby reduced, because the specialized fitter reaches the setting of the rim already after the first tensioning of the spokes and the simultaneous verification of roundness and flatness (while, at present, he has to proceed through successive setting phases, operating a crosswise pull of the spoke and the subsequent re-setting of the roundness and flatness).

A perfect stability of the wheel in use is obtained while, according to the known technique, all the settings operated by the fitter do not allow anyhow to ever reach this stability.

Up to distances of 500–800 km., the wheel of known technique—on account of the repeated compressive and tractive action on the spokes—require continuous adjustments of flatness and roundness. Hence, the setting while running is practically impossible. This can instead be satisfactorily obtained with the invention.

The spokes of the wheel mounted according to the teachings of the invention practically no longer take up the flexure curve which is typical of known wheels, whereby the life of said spokes may practically be endless.

It is understood that there may be other embodiments of the invention, differing from those heretofore described and illustrated, without thereby departing from the scope of the invention itself.

I claim:

1. Bush for receiving a spoke nipple comprising a head and a threaded shaft, said bush being adapted to be riveted to a bicycle wheel rim of the type having an outer and an inner element connected by two flanks and a series of holes formed through said inner and outer elements, the axis of each said hole being inclined with respect to a first plane perpendicular to the axis of said rim and passing through the said hole and inclined with respect to a second plane including the axis of the rim and passing through the said hole, said bush being adapted to be received in a said hole between said outer and inner elements, said bush comprising a first rigid cylindrical tube for receiving the head of a said nipple and a second rigid cylindrical tube of lesser diameter than and coaxial with said first tube for receiving the shaft of a said nipple, said second and first tubes being partially telescoped and rigidly joined by a connecting element, said connecting element being so designed as to provide a base for the head of the nipple in a plane perpendicular to the axis of the tubes and an abutment surface for the bush to abut against the inside wall of said inner element, such that a said spoke nipple will be received in said bush and securely registered in a position coaxial with a spoke of an assembled tensioned bicycle wheel.

2. Bush according to claim 1, wherein said connecting element is asymmetric about the axis of said tubes and has a contact surface adapted to bear against the inside wall of said inner element entirely around the axis of said tubes when said wheel is in assembled relation.

3. Bush according to claim 1, wherein the inclination of the axis of each said hole with respect to said first and second planes is half the mean angle between maximum deviation and minimum deviation of the wheel spoke.

4. In a rim for bicycle wheels of the type having an outer and an inner element connected by two flanks, a series of holes formed through said inner and outer elements, the axis of each said hole being inclined with respect to a plane perpendicular to the axis of the rim and passing through the said hole and inclined with respect to a second plane containing the axis of the rim and passing through the said hole, said holes being adapted to receive spoke nipples comprising a head and a threaded shaft for threading to a spoke of a tensioned assembled bicycle wheel; the improvement comprising: bushes riveted between said outer and inner elements, one bush in each said hole, for receiving said spoke nipple, said bushes comprising a first rigid cylindrical tube for receiving the head of said nipple and a second rigid cylindrical tube of lesser diameter than and coaxial with said first tube for receiving the shaft of said nipple, said second and first tubes being partially telescoped and rigidly joined by a connecting element, said connecting element being so designed as to provide a base for the head of the nipple in a plane perpendicular to the axis of the tubes and an abutment surface for the bush to abut against the interior wall of said inner element, whereby the said spoke nipple and spoke are coaxial with one another when the wheel is in assembled tensioned relation.

5. Rim according to claim 4, wherein the abutment surface of said bush is so designed as to bear against the interior wall of said inner element entirely around the axis of said tubes.

6. Bush according to claim 4, wherein the inclination of the axis of each said hole with respect to said first and second planes is half the mean angle between maximum deviation and minimum deviation of the wheel spoke.

* * * * *